United States Patent [19]

Zhu et al.

[11] Patent Number: 6,090,316
[45] Date of Patent: Jul. 18, 2000

[54] MELAMINE AND ALUMINUM HYDROXIDE BLEND AND METHOD FOR MAKING AND USING THE SAME

[75] Inventors: Weiming Zhu, Marietta; Kurt Henry Moller, Warner Robins; Paris W. Chen, Acworth, all of Ga.

[73] Assignee: J. M. Huber Corporation, Edison, N.J.

[21] Appl. No.: 09/071,627

[22] Filed: May 1, 1998

[51] Int. Cl.⁷ .......................... C09K 21/02; C09K 21/06
[52] U.S. Cl. .......................... 252/609; 524/86; 524/437
[58] Field of Search .......................... 252/609; 524/86, 524/437, 447, 449

[56] References Cited

U.S. PATENT DOCUMENTS

| | | | |
|---|---|---|---|
| 3,595,486 | 7/1971 | Stephanoff | 241/5 |
| 3,648,936 | 3/1972 | Stephanoff | 241/5 |
| 3,761,660 | 9/1973 | Jones . | |
| 4,001,177 | 1/1977 | Tsutsumi et al. | 524/101 |
| 4,026,810 | 5/1977 | Bost | 252/8.1 |
| 4,105,465 | 8/1978 | Berger . | |
| 4,243,755 | 1/1981 | Marx et al. | 521/99 |
| 4,293,657 | 10/1981 | Nisser et al. | 521/121 |
| 4,525,494 | 6/1985 | Andy | 523/200 |
| 4,678,607 | 7/1987 | Reitz | 252/609 |
| 5,087,384 | 2/1992 | Horacek et al. | 252/182.14 |
| 5,147,912 | 9/1992 | Moore | 524/101 |
| 5,843,220 | 12/1998 | Bäbler | 106/415 |

*Primary Examiner*—Joseph D. Anthony
*Attorney, Agent, or Firm*—Carlos Nieves

[57] ABSTRACT

A method of making an aluminum hydroxide and melamine blend. The method comprises jet milling a quantity of coarse particle size melamine until a line particle size melamine is obtain which has a median particle size of from about 0.5 $\mu$m to about 45 $\mu$m, passing the fine particle size melamine through an air classifier and a cyclone separator, and admixing the fine particle size melamine with a quantity of surface treated aluminum hydroxide in a high speed mixer.

12 Claims, No Drawings

MELAMINE AND ALUMINUM HYDROXIDE BLEND AND METHOD FOR MAKING AND USING THE SAME

TECHNICAL FIELD

This invention relates to melamine and aluminum hydroxide blends. The invention also relates to methods of making and using such blends as non-halogen based flame retardant systems for polymers.

BACKGROUND OF THE INVENTION

Aluminum hydroxide, also known as alumina trihydrate (ATH) or hydrated alumina, is a non-halogen flame retardant based on the chemical formula $Al(OH)_3$. It has been used in a variety of polymers, including unsaturated polyesters, elastomers, and some thermoplastics to reduce their combustibility. Aluminum hydroxide provides a flame retardant effect through its endothermic water release under heating and burning conditions. The use of aluminum hydroxide as a flame retardant has been disclosed in U.S. Pat. Nos. 4,105,465 and 4,525,494. A drawback associated with aluminum hydroxide is that high loading is often required to attain effective flame retardancy. At such high loading, the physical properties of aluminum hydroxide filled polymer compositions deteriorates substantially. Processing difficulties in manufacturing such highly loaded polymer compositions are also experienced, even in the presence of coupling agents such as organosilanes or other surface treatment agents such as fatty acids.

Melamine is also a flame retardant, mainly used in intumescent paints and polyurethane foams. Its mechanism of flame retardancy appears to involve endothermic sublimation and release of less combustible gases upon heating and burning. Due to the coarse nature of melamine particles, the melamine filled polymer compositions generally exhibit poor mechanical properties. Furthermore, the conventional dry grinding of melamine powder with ceramic media to reduce the particle size of melamine is not effective. This is due in part to the melamine powder becoming soft as mechanical energy is applied to it, thereby causing the melamine to smear onto the grinding media and, consequently, the grinding process is substantially impeded.

Thermoplastic polyolefins are widely used in consumer products, electric and electronic appliances, automobile parts, and other industrial applications. These polymers are normally flammable and can be ignited easily by flame or by overheating. The flammability of these thermoplastic polyolefins can be substantially reduced by the incorporation of flame retardants. One common approach is to use halogenated (brominated or chlorinated) additives along with antimony oxide or other metal oxides. Such systems generate hydrogen bromide (HBr) or hydrogen chloride (HCl) during the combustion of polymers to trap free radicals which are found in the flame zone. The inherent shortcoming of using halogenated additives is the evolution of dense smoke, and corrosive and toxic gases such as HBr and HCl.

The second approach to flame retarding thermoplastics is to use a hydrated mineral or surface treated hydrated mineral. A common mineral utilized is aluminum hydroxide. As stated above, a drawback of using hydrated minerals such as aluminum hydroxide is the high loadings needed to achieve effective flame retardancy which have an adverse impact on the mechanical properties of polyolefin compositions.

Surface treated aluminum hydroxide and melamine blends have been developed which require less loading to attain effective flame retardancy and thereby exhibit acceptable mechanical properties when added to polymeric materials. Further, the blends do not emit significant amounts of corrosive gases and smoke when the materials to which they are added are exposed to fire. However, since the methods for making these blends are inefficient, they have not heretofore been effectively introduced into thermoplastic polyolefin materials such as polypropylenes and polyethylenes.

SUMMARY OF THE INVENTION

The present invention is designed to overcome the deficiencies of the prior art discussed above. It is an object of the invention to provide a method of making fine particle melamine powder useful as a flame retardant additive for thermoplastics.

It is a further object of the invention to provide an efficient method of making aluminum hydroxide and melamine blends.

It is yet another object of the invention to provide surface treated aluminum hydroxide and melamine blends which can be readily incorporated into polyolefin compositions to provide the same with high levels of flame retardancy without adversely affecting the mechanical properties thereof.

In accordance with the illustrative embodiments and demonstrating features of the present invention, there is provided methods of making treated aluminum hydroxide and melamine blends. One preferred method comprises jet milling a quantity of coarse particle size melamine until a fine particle size melamine is obtained which has a median particle size of about 0.5 $\mu$m to about 45 $\mu$m, passing the fine particle size melamine through an air classifier and a cyclone separator, and admixing the fine particle size melamine with a quantity of treated aluminum hydroxide in a high speed mixer. The invention also discloses a blend produced by the above method which is particularly suited to be added to a polyolefin to provide necessary flame retardancy without having a deleterious effect on the mechanical properties of the polymer.

The invention further discloses flame retardant blends comprising an effective synergistic combination of aluminum hydroxide/melamine treated with in organosilane. These blends when added to polyolefins provide desirable levels of flame retardancy and unexpected thermal stability under heat aging condition.

Other objects, features, and advantages will be readily apparent from the following detailed description of preferred embodiments thereof.

DETAILED DESCRIPTION OF PREFERRED EMBODIMENTS

In accordance with the preceding summary, the present invention is directed toward melamine and treated aluminum hydroxide blends and methods of making and using the same.

In the preferred embodiment, the treated aluminum hydroxide (a.k.a. alumina trihydrate or hydrated alumina) utilized is Micral® 1500 which is commercially available from J. M. Huber Corporation of Edison, N.J. The preferred median particle size of aluminum hydroxide is in the range of from about 0.1 $\mu$m to about 15 $\mu$m, as determined in aqueous media using a Micrometrics Sedigraph Model 5100 instrument. The treated aturainum hydroxide is preferably made by admixing aluminum hydroxide with a coupling agent such as an organosilane. The organosilane is used to surface treat the aluminum hydroxide. Any silanes can be used which facilitate the favorable interaction of a polyolefin and a flame retardant, and which do not adversely affect the desired properties of the polyolefin composition. Further, the aluminum hydroxide could also be treated with other surface treatment agents such as an organic acid, an organotitanate or an organozirconate. The surface treatment agent preferably comprises about 0.25 to about 3.0% by weight of the composition.

The melamine component (2, 4, 6-triamino-1,3,5-triazine) of the blend is a white, crystalline organic compound that is insoluble in most organic solvents. Utilizing melamine with a reduced particle size, preferably in the range of from about 0.5 $\mu$m to about 45 $\mu$m, yields a blend with the most desirable properties as discussed below. However, inelamine is a relatively soft material and, therefore, tends to smear onto the media used during the grinding process.

It has been discovered that the particle size of the melamine can be effectively reduced through an air-jet milling process. Specifically, coarse melamine is pulverized in a mill vessel at a airflow rate of about 440 to about 900 ft$^3$/min. The air flow rate is controlled by the grind air pressure which is preferably of from about 90 to about 120 psi. The finely pulverized melamine powder is then discharged through an air classifier and a cyclone separator at a classification speed of from about 1700 to about 6000 rpm. The grind airflow rate and the speed of the classification are two critical factors which effect the particle size of the melamine powder and govern the morphology of the same. As stated above, the preferred median particle size of the melamine is in the range of about 0.5 $\mu$m to about 45 $\mu$m, as measured by a Cilas 920 laser light scattering particle size analyzer using propanol.

Once the particle size of the melamine powder has been reduced to the desired range, it is admixed with the treated aluminum hydroxide in a mixer, such as a Henschel mixer, at a mixing speed of from about 500 rpm to about 4000 rpm. The weigh ratio of treated aluminum hydroxide to melamine is preferably in the range of from about 2:8 to 8:2 and, more preferably, in the range of about 4:6 to about 6:4. The high mixing speed generally shortens the blending time. The resulting blend comprises synergistically effective amounts of melamine and treated aluminum hydroxide. It should be noted that instead of first treating the aluminum hydroxide with an organosilane, it can be admixed, in untreated form, with the reduced particle size melamine, and the organosilane (or other surface treatment agent) can be added to the resultant admixture in the high speed mixer.

This blend is preferably compounded with a polyolefin such as, by way of example and not limitation, polyethylene, polypropylene, ethylene-higher olefin copolymers, ethylene-vinyl acetate copolymers, ethylene-acrylic acid (and its alkyl ester) copolymers, ethylene-vinylsilane copolymers, ethylene-polypropylene copolymers, polybutenes, polybutadienes, polyisoprenes, and blends thereof to confer desirable flame retardancy, tensile strength, elongation and impact strength. The treated aluminum hydroxide/melamine blend preferably comprises from about 10 to about 70 weight percent of the total polyolefin composition.

The polyolefin composition of the present invention may include a siliceous mineral surface-treated with an organosilane. The preferred silica-based minerals are mica, talc, fumed silica, kaolin clay, calcined kaolin clay and aluminosilicate minerals. It has been determined that of from about 5 to about 10 (or more) weight percent (of the total composition) of a silane-treated siliceous mineral may be used to replace the same amount of aluminum hydroxide or melamine.

The polyolefin compositions of the present invention may also include antioxidants (such as phenolic, aromatic amines, thioesters, phosphites, or their combinations), colorants, fiberglasses, or other reinforcing agents to impart the physical properties for the compositions.

The polyolefin compositions of the present invention maxy also include phenol formaldehyde resins (both single-stage and two-stage types), epichlorohydrin modified phenol formaldehyde resins, silicones, styrenic copolymers (such as styrene-butadiene, styrene-isoprene, and styrene-olefin copolymers) or modified styrenic copolymers (such as modified styrene-butadiene, modified styrene-isoprene, and modified styrene-olefin copolymers), or modified polyolefins to enhance the flame retardancy and mechanical properties of the compositions. The modified styrenic copolymers or modified polyolefins are those polymers partially functionalized with a compound of ethylenically unsaturated carboxylic acid, acid anlydride, carboxylic ester, acid amide, or the derivatives of these compounds therefor.

It has been discovered that the physical properties of the polyolefin composition are improved by the proper selection of particle sizes of melamine (e.g., 0.5 $\mu$m to 45 $\mu$m) and treated aluminum hydroxide (e.g., 0.1 $\mu$m to 15 $\mu$m) in the blend. It has been specifically discovered that polypropylene compositions containing treated aluminum hydroxide/melamine blends or blends of melamine and treated aluminum hydroxide in which the particle size of melamine is equal to or larger than the particle size of the aluminum hydroxide exhibit improved physical properties such as improved thermal stability under heat aging condition which results in longer service lifetime of the polyolefin composition.

The improved properties can be attributed to favorable particle packing between melamine and aluminum hydroxide powders. It appears that the particle packing improves the dispersion of melamine and treated aluminum hydroxide in the polymer matrix and increases the chemical interaction between the surfaces of the powders and the polymer.

In order to facilitate an understanding of the principles associated with the foregoing method and composition, the following examples are provided.

EXAMPLE 1

A number of fine melamine powders having varying particle sizes were prepared as follows. Coarse melamine powder having a median particle size of about 86 $\mu$m was introduced into an air-jet mill vessel through a volumetric feeder located above the mill. The jet milling took place at an air flow rate from 440 to 900 ft$^3$/min. for approximately 30 minutes. During the jet milling, the fine powder of pulverized melamine was removed from the mill vessel by air through a classifier at a turning speed of 1570 to 6000 rpm, and was collected from a cyclone separator. The powder was subsequently analyzed with a Cilas 920 laser light scattering analyzer to determine the median and top particle sizes. The milling conditions and properties of fine melamine powders are listed in Table I.

TABLE I

| Melamine Type | Grind Air Pressure (psi) | Grind Airflow Rate (ft$^3$/min.) | Classifier Speed (rpm) | Median Particle Size ($\mu$m) | Top size, 100% smaller than ($\mu$m) |
|---|---|---|---|---|---|
| 1A | 90 | 459 | 1750 | 3.81 | 57 |
| 1B | 90 | 450 | 2500 | 2.93 | 26 |
| 1C | 90 | 698 | 4250 | 2.44 | 11 |

TABLE I-continued

| Melamine Type | Grind Air Pressure (psi) | Grind Airflow Rate (ft³/min.) | Classifier Speed (rpm) | Median Particle Size (μm) | Top size, 100% smaller than (μm) |
|---|---|---|---|---|---|
| 1D | 90 | 447 | 3500 | 2.13 | 11 |
| 1E | 118 | 892 | 6000 | 1.27 | 5.5 |
| 1F | 103 | 759 | 6000 | 1.25 | 5.5 |

EXAMPLE 2

A series of melamine and treated aluminum hydroxide blends were prepared by mixing 50 parts (by weight) of melamine powder with 50 parts of treated aluminum hydroxide for about 3 minutes at 2700 rpm in a Henschel mixer. In these blends, the melamine powders had particle sizes from 2.13 μm to 3.81 μm. The treated aluminum hydroxide was made by mixing 100 parts of aluminum hydroxide having a median particle size of 1.5 μm, 2.6 μm, or 3.5 μm with 2 parts of an organosilane sold under the trademark Silquest® RC-1 by OSi Specialties, Inc. (a subsidiary of Witco Corp.) in a mixer.

TABLE II

| Blend No. | Melamine Employed From Table I | Median Particle Size of Aluminum Hydroxide (μm) |
|---|---|---|
| 2A | 1A | 1.5 |
| 2B | 1B | 1.5 |
| 2C | 1C | 1.5 |
| 2D | 1D | 1.5 |
| 2E | 1E | 1.5 |
| 2F | 1F | 1.5 |
| 2G | 1E | 2.6 |
| 2H | 1E | 3.5 |

EXAMPLE 3

A series of polypropylene compositions were prepared as follows. Sixty (60) parts of polypropylene sold under the trademark Pro-fax 6523® (by Montell N. A., Inc. and forty (40) parts of a blend of melamine and treated aluminum hydroxide were mixed at 190 to 195° C. for seven (7) minutes in a Brabender prepmixer. The resulting mixture was compression-molded at 200° C. into sheet. The sheet was cut into test bars for measurements of tensile, elongation, and Gardner impact strength. The tensile strength and elongation of the polypropylene compositions were measured according to the procedures of ASTM D638. The Gardner impact strength was performed according to the procedures of ASTM D5420 with a GE type geometry. The results are displayed in Table III.

TABLE III

| Example No. | Melamine/ Treated ATH blend | Tensile Strength (psi) | Elongation (%) | Gardner Impact Strength at ⅛" thickness |
|---|---|---|---|---|
| 3A | 2A | 3270 | 21 | 4.9 |
| 3B | 2B | 3293 | 11 | 4.9 |
| 3C | 2C | 3171 | 15 | 3.6 |
| 3D | 2D | 3327 | 5 | 3.8 |
| 3E | 2E | 2941 | 3 | 2.6 |
| 3F | 2F | 3005 | 5 | 2.6 |
| 3G | 2G | 2945 | 9 | 2.3 |
| 3H | 2H | 2868 | 10 | 2.8 |

The above data shows the effect of particle packing between melamine and treated aluminum hydroxide powders on the physical properties of the polypropylene compositions. Examples 3A to 3D shows superior physical properties over Examples 3E to 3H. Examples 3A to 3D consisted of melamine powders having larger particle sizes than the particle sizes of the treated aluminum hydroxide. By contrast, Examples 3E to 3H contained melamine with median particle sizes in the range of 1.25 to 1.27 μm. Such particle sizes were smaller than the particle sizes of the aluminum hydroxide used. As can be seen from Table III, the finest melamine did not offer the highest tensile strength as normally expected. Additionally, Examples 3E and 3F had lower impact strengths than Examples 3A to 3D. This was also unexpected as it is generally believed that the smaller the particle sizes, the higher the impact strength.

The foregoing examples show that favorable particle packing between melamine and treated aluminum hydroxide powders can be obtained through the proper selection of the particle size of the same. Such favorable particle packing results in enhanced physical properties of the polymer compositions to which the blends are added.

The following additional examples were prepared and flame retardancy tests were conducted. The flame retardancy tests utilized were UL 94 vertical burning tests and oxygen index tests. The detailed procedures of the UL 94 test are described in the bulletin entitled "Tests for Flammability of Plastic Materials for Parts in Devices and Appliances" by Underwriters Laboratories, Inc. In this test, a V-0 rating indicates the highest degree of flame retardancy, followed by V-1 and V-2 ratings. All three of these ratings are considered self-extinguishing and, therefore, are considered flame retardant or fire resistant. If the test sample burns and fails to attain any of the above three ratings, it will be rated "burn" in the invention. The sample size for the test was 125 mm (5 inches)×13 mm (0.5 inch)×3.2 mm (0.125 inch). The oxygen index is measured according to the procedures of ASTM D2863, with a sample size of 125 mm×6.5 mm×3.2 mm. The higher oxygen index value indicates the better flame retardancy.

EXAMPLE 4

A surface treated aluminum hydroxide/melamine blend was prepared as follows. Aluminum hydroxide (40 parts) and melamine (60 parts) were mixed with Silquest® RC-1 silane (1 part) for 30 minutes in a Henschel mixer (parts are by weight).

EXAMPLE 5

A blend of melamine and surface treated aluminum hydroxide was prepared by mixing 40 parts aluminum hydroxide with 1 part Silquest® RC-1 silane for 30 minutes in a Henchel mixer. Melamine (60 parts) was then added into the mixer, and the resulting mixture an additional 5 minutes.

EXAMPLES 6–9

In a manner similar to Example 4 above, surface treated aluminum hydroxide/melamine blends, a surface treated aluminum hydroxide, and a surface treated melamine were prepared (Table IV). It should be noted that while the surface treatment agent actually becomes chemically bound to the aluminum hydroxide (either through hydrogen bonding interations or by covalent bonding with surface hydroxyls), it only coats the surface of the melamine.

TABLE IV

| Example No. | ATH (part, by wt.) | Melamine (part, by wt.) | RC-1 (part, by wt.) |
| --- | --- | --- | --- |
| 6 | 50 | 50 | 1 |
| 7 | 60 | 40 | 1 |
| 8 | 100 | 0 | 1 |
| 9 | 0 | 100 | 1 |

EXAMPLE 10

In a manner similar to Example 5, aluminum hydroxide (50 parts, by wt.) was mixed with phenyltrimethoxysilane (1 part, by wt., available from Hüils America) for 30 minutes. Melamine (50 parts, by wt.) was added, and the resulting mixture was mixed for another 5 minutes.

EXAMPLE 11

A blend of surface treated aluminum hydroxide, surface treated mica, and melamine was prepared as follows. The surface treated aluminum hydroxide was prepared by mixing 25 parts of aluminum hydroxide with 0.5 part of Silquest® RC-1 silane. The surface treated mica was prepared by mixing 15 parts of a wet-ground muscovit, mica with 0.3 part Silquest® RC-1 silane (parts in wt. %). The above treated aluminum hydroxide and treated mica were mixed with 60 parts of melamine for 2 minutes in a mixer.

EXAMPLE 12

An untreated aluminum hydroxide and melamine blend was prepared by mixing aluminum hydroxide (40 parts) and melamine (60 parts) for 5 minutes.

EXAMPLE 13

An untreated aluminum hydroxide and melamine blend was prepared by mixing aluminum hydroxide (50 parts) and melamine (50 parts) for 5 minutes.

EXAMPLES 14–25

A series of thermoplastic polyolefin compositions were prepared as follows. Approximately sixty (60) parts of polypropylene (available under the mark Pro-fax® 6523 from Montell) and approximately forty (40) parts of one of the treated aluminum hydroxide/melamine blends were mixed in a Brabender prepmixer at about 190–195° C. for 7 minutes. The resulting compound was compression-molded at 200° C. in a plate which was subsequently cut into test bars. The UL 94 burning test and oxygen index test were conducted for these compositions (Table V).

TABLE V

| Example No. | ATH/Melamine blend prepared in | UL 94 Rating | Oxygen Index |
| --- | --- | --- | --- |
| 15 | Example 4 | V-0 | 27 |
| 16 | Example 5 | V-0 | 27 |
| 17 | Example 6 | V-0 | 27 |
| 18 | Example 7 | V-0 | 27 |
| 19 | Example 8 | Burn | 24 |
| 20 | Example 9 | Burn | 22 |
| 21[a] | Example 10 | V-0 | — |
| 22 | Example 11 | V-0 | — |
| 23 | Example 12 | Burn | 25 |
| 24 | Example 13 | Burn | 25 |
| 25[b] | Example 13 | Burn | — |

[a] In this composition, 55.6 parts of Pro-fax ® 6523 and 44.4 parts of treated aluminum hydroxide and melamine blend prepared in Example 10 were used.
[b] In this composition, 55.6 parts of Pro-fax ® 6523 and 44.4 parts of untreated aluminum hydroxide and melamine blend prepared in Example 13 were used.

The above test data indicates that the surface treated aluminum hydroxide (Example 19), treated melamine (Example 20), or untreated aluminum hydroxide/melamine blends (Examples 23–25) did not provide desired flame retardancy. The above data, however, indicates that the surface treated aluminum hydroxide/melamine blends, the blend of melamine and treated aluminum hydroxide, or the blend of treated aluminum hydroxide and treated mica and melamine unexpectedly conferred the improved flame retardancy with UL 94 V-0 ratings. These blends also provided higher oxygen values than treated aluminum hydroxide or treated melamine alone, or untreated aluminum hydroxide/melamine blends.

EXAMPLE 26

A composition was prepared in which 50 parts of polypropylene (F120F, available from Aristech Chemical Corp.), 48 parts of the blend prepared in Example 6, and 2 parts of a phenol formaldehyde resin (CRJ-418, available from Schenectady International, Inc.) were used (parts by wt.). This polyolefin composition had a UL 94 V-0) rating.

EXAMPLE 27

A composition was prepared in which 55.6 parts of an impact-resistant polypropylene (Aristech TI4040G) and 44.4 parts of the blend prepared in Example 5 were used. This composition attained a UL 94 V-0 rating.

EXAMPLE 28

In a manner similar to Example 27 above, a composition was prepared in which a high density polyethylene (Dow 08054, Dow Chemical product) was substituted for polypropylene. The resulting composition gave a UL 94 V-0 rating.

EXAMPLE 29

In a manner similar to Example 27 above, a composition was prepared in which ethylene-vinyl acetate copolymer (Elvax® 470, available from DuPont) was substituted for polypropylene. The resulting composition attained a UL 94 V-0 rating.

The following experiments were designed to test the thermal stability of the polyolefin compositions. The polyolefin compositions from Examples 15–20, 23 and 24 were heat-aged at 150° C. for 4 days in an air-circulating oven. The samples were removed from the oven, cooled down to room temperature (23° C.), and conditioned at 23° C. for 48 hours. The thermal stability of the samples was evaluated by measuring their flexural strength, and by comparing with those of un-aged samples to determine the percentage of the retained strength. The measurement of the flexural strength was performed according to the procedures of ASTM D790 using 3 point blend, 2 inch span, and a crosshead speed of 0.05 in./min. (Table VI)

TABLE VI

| Composition Employed from | Type of Additives | Flexural Strength after Heat Aging | Percentage of Retained Strength (%) |
|---|---|---|---|
| Example 15 | RC-1 Treated ATH/melamine | 6410 | 106 |
| Example 16 | RC-1 Treated ATH/melamine | 6100 | 100 |
| Example 17 | RC-1 Treated ATH/melamine | 6560 | 102 |
| Example 18 | RC-1 Treated ATH/melamine | 6490 | 107 |
| Example 19 | RC-1 Treated ATH | 6030 | 88 |
| Example 20 | RC-1 Treated melamine | 5320 | 95 |
| Example 23 | Untreated ATH/melamine | 3930 | 65 |
| Example 24 | Untreated ATH/melamine | 657 | 10 |

The above test data shows the unexpected improved flexural strength provided by the surface treated aluminum hydroxide/melamine blends after heat-aging. This property enhancement indicates good thermal stability of the polymer compositions, which means longer service lifetime of the compositions. In cases of using treated aluminum hydroxide, treated melamine, or untreated aluminum hydroxide/melamine blends, the physical property deteriorated significantly after heat-aging, indicating poor thermal stability.

The present invention may be embodied in other specific forms without departing from the spirit or essential attributes thereof and accordingly reference should be made to the appended claims rather than to the foregoing specification as indicating, the scope of the invention.

What is claimed is:

1. A melamine and aluminum hydroxide blend comprising:
    aluminum hydroxide having a median particle size of from about 0.1 µm to about 15.0 µm,
    melamine having a median particle size of from about 0.5 µm to about 45 µm, and
    a surface treatment agent selected from the group consisting of an organosilane, an organic acid, an organotitanate and an organozirconate;
    said surface treatment agent being present on the surfaces of said aluminum hydroxide and said melamine.

2. The blend of claim 1 wherein said aluminum hydroxide and said melamine each comprises about 30% to about 70% by weight of the blend.

3. The blend of claim 1 wherein the median particle size of said melamine is greater than the median particle size of said aluminum hydroxide.

4. The blend of claim 1 further including a surface treated siliceous mineral.

5. The composition of claim 4 wherein said siliceous mineral is treated with a surface treatment agent selected from the group consisting of an organ-osilane, an organic acid, an organotitanate, and an organozirconate.

6. The composition of claim 4 wherein said surface treated siliceous mineral is selected from the group consisting of mica, talc, fumed silica, kaolin clay, calcined kaolin clay and an aluminosilicate mineral.

7. A method of making an aluminum hydroxide arid melamine blend comprising the steps of:
    providing a quantity of coarse particle size melamine;
    grinding said coarse particle size melamine until a fine particle size melamine is obtained having a median particle size of about 0.5 µm to about 45 µm;
    classifying said fine particle size melamine;
    admixing said fine particle size melamine with a quantity of aluminum hydroxide in a high speed mixer, and
    admixing said aluminum hydroxide and said melamine with a surface treatment agent selected from the group consisting of an organosilane, an organic acid, an organotitanate, and an organozirconate.

8. The method of claim 7 wherein said grinding occurs at a grind airflow rate of about 440 to about 990 ft$^3$/min. and under about 90 to about 120 psi of pressure.

9. The method of claim 7 wherein said classifying occurs at a classification speed of from about 1700 to about 6000 rpm.

10. The method of claim 7 wherein said aluminum hydroxide has a median particle size equal to or smaller than the median particle size of the fine particle size melamine.

11. The method of claim 7 wherein said fine particle size melamine and said aluminum hydroxide are admixed at a turning speed of from about 500 to about 4000 rpm.

12. The method of claim 7 further including admixing a quantity of surface treated siliceous mineral to said melamine and said aluminum hydroxide in said high speed mixer.

* * * * *